(12) United States Patent
Short et al.

(10) Patent No.: US 8,172,512 B2
(45) Date of Patent: May 8, 2012

(54) ACCESSORY GEARBOX SYSTEM WITH COMPRESSOR DRIVEN SEAL AIR SUPPLY

(75) Inventors: Keith E. Short, Rockford, IL (US); Jeffrey M. Makulec, Rockford, IL (US); Brian Kent Rockwell, Rockford, IL (US); Michael F. Cass, Rockford, IL (US); Gregory W. Vermillion, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1020 days.

(21) Appl. No.: 12/107,811

(22) Filed: Apr. 23, 2008

(65) Prior Publication Data
US 2009/0324396 A1  Dec. 31, 2009

(51) Int. Cl.
*F01D 15/00* (2006.01)
(52) U.S. Cl. .................... 415/121.3; 415/124.1
(58) Field of Classification Search .......... 415/124.1, 415/121.3, 232; 60/39.83, 226.1, 802
See application file for complete search history.

(56) References Cited

U.S. PATENT DOCUMENTS

| | | |
|---|---|---|
| 2,924,937 A | 2/1960 | Leibach |
| 2,925,215 A * | 2/1960 | Weatherbee .................. 417/323 |
| 2,978,869 A | 4/1961 | Hiscock et al. |
| 3,378,104 A * | 4/1968 | Venable ...................... 184/6.12 |
| 3,830,058 A | 8/1974 | Ainsworth |
| 3,976,165 A | 8/1976 | Pilarczyk |
| 4,057,371 A | 11/1977 | Pilarczyk |
| 4,525,995 A * | 7/1985 | Clark ........................... 60/39.08 |
| 4,594,850 A | 6/1986 | Joy |
| 4,682,505 A | 7/1987 | Morissette et al. |
| 4,713,982 A | 12/1987 | Fluegel et al. |
| 4,756,664 A | 7/1988 | Cohen et al. |
| 4,817,382 A | 4/1989 | Rudolph et al. |
| 4,887,424 A | 12/1989 | Geidel et al. |
| 4,891,934 A * | 1/1990 | Huelster ..................... 60/39.08 |
| 5,110,257 A | 5/1992 | Hibner et al. |
| 5,385,011 A | 1/1995 | Stewart, Jr. |
| 5,555,722 A | 9/1996 | Mehr-Ayin et al. |
| 6,079,198 A * | 6/2000 | Prowse et al. ................... 60/776 |
| 6,357,220 B1 | 3/2002 | Snyder et al. |
| 6,513,335 B2 * | 2/2003 | Fukutani ......................... 60/785 |
| 6,571,563 B2 | 6/2003 | Yim et al. |
| 6,893,478 B2 * | 5/2005 | Care et al. ....................... 55/337 |
| 7,055,303 B2 | 6/2006 | Macfarlane et al. |
| 7,093,447 B2 * | 8/2006 | Thompson et al. ............. 60/784 |
| 2005/0183540 A1 | 8/2005 | Miller |
| 2006/0248900 A1 | 11/2006 | Suciu et al. |
| 2008/0066444 A1 * | 3/2008 | Cornelius et al. .......... 60/39.181 |

FOREIGN PATENT DOCUMENTS
EP  0270444  8/1988
* cited by examiner

*Primary Examiner* — Edward Look
*Assistant Examiner* — Andrew C Knopp
(74) *Attorney, Agent, or Firm* — Carlson Gaskey & Olds, P.C.

(57) ABSTRACT

An accessory gearbox system for a gas turbine engine includes an accessory compressor mounted to a gearbox housing. The gearbox housing defines a seal air core, and the gearbox housing communicates a seal airflow through the seal air core.

31 Claims, 7 Drawing Sheets

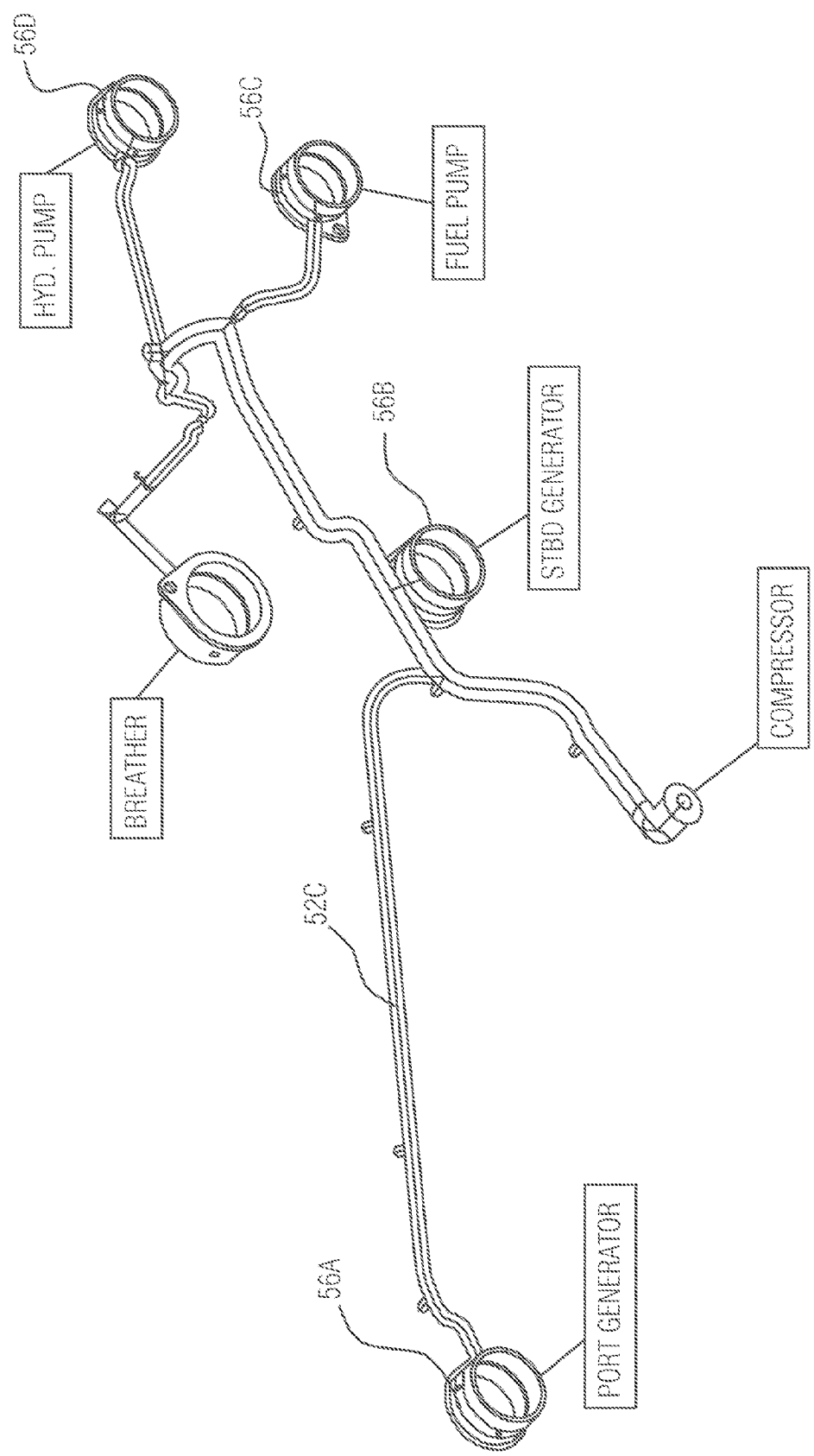

ACCESSORY GEARBOX SYSTEM WITH
COMPRESSOR DRIVEN SEAL AIR SUPPLY

BACKGROUND

The present invention relates to a gas turbine engine, and more particularly to accessory gearboxes thereof.

Gas turbine engines often include a mechanically driven accessory gearbox to drive accessory systems such as, but not limited to, power generators, fuel pumps, oil pumps and hydraulic pumps. The power requirements for both military and commercial aircraft continue to increase demands on the accessory gearbox as the number of electrical systems within the aircraft continue to increase.

Conventional gas turbine engine accessory gearboxes use a gearbox housing mountable to an engine case section. Air pressurized labyrinth seals are typically used to maintain pressure within the accessory gearbox housing and prevent oil from leaking out around each accessory shaft, which drives each accessory system. Bleed air from the engine is communicated as seal air to the accessory shaft labyrinth seals by pipe cores incorporated within the gearbox housing.

The bleed air is typically sourced from sections of the engine to assure the seal air is below a predefined temperature (approximately 350° F.; 177° C.) so as to avoid effects on the typically aluminum gearbox housing and labyrinth seals. Oftentimes, such bleed air usage reduces engine efficiency or may not be available at such temperatures. As the seal core routings are often located in high stress areas, structural adjustments to accommodate the relatively high temperature bleed air may be required which may result in gearbox housing of increased weight.

SUMMARY

An accessory gearbox system according to an exemplary aspect of the present invention includes: a gearbox housing which defines at least one seal air core; and a accessory compressor mounted to the gearbox housing to communicate a seal airflow through the at least one seal air core.

A gas turbine engine according to an exemplary aspect of the present invention includes: an engine frame section defined about an axis; an engine spool rotationally mounted along the axis; an accessory gearbox mounted to the frame section, the accessory gearbox driven by the engine spool, the accessory gearbox comprising: a gearbox housing which defines at least one seal air core; and a accessory compressor mounted to the gearbox housing to communicate a seal airflow through the at least one seal air core.

A method of providing a seal air supply to an accessory gearbox according to an exemplary aspect of the present invention includes: compressing a seal air with a accessory compressor mounted to an accessory gearbox housing; and communicating the seal air though through at least one seal air core within the accessory gearbox housing to an accessory shaft seal mounted to the accessory gearbox housing.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows:

FIG. 2C is a schematic view of a multiple of seal air cores within one housing portion of the accessory gearbox housing of FIG. 2B;

DETAILED DESCRIPTION OF THE
EXEMPLARY EMBODIMENTS

Figure 1:
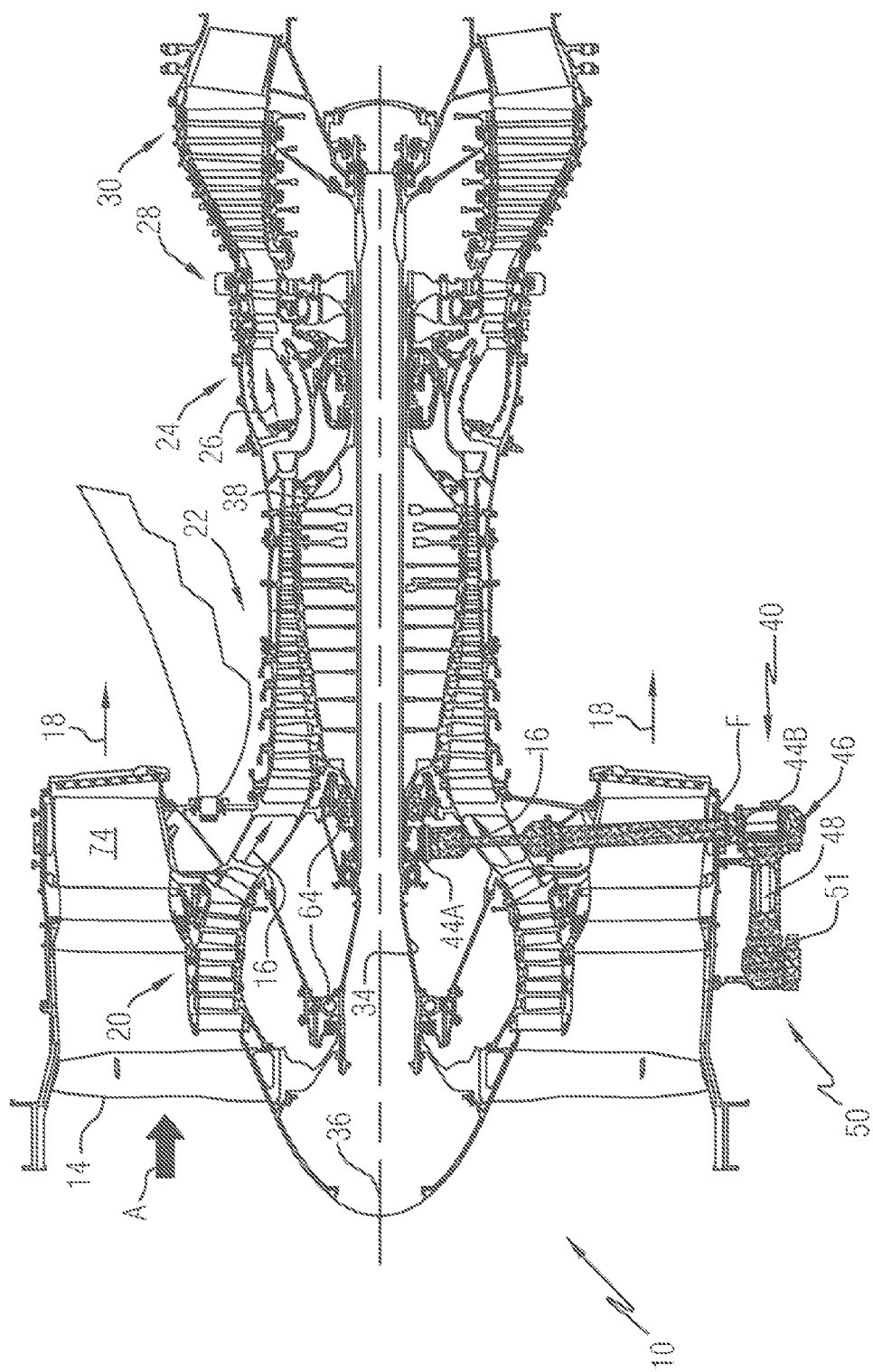
FIG. 1 is a general perspective view of an exemplary gas turbine engine for use with the present invention.

FIG. 1 illustrates a schematic sectional view of a gas turbine engine 10. Air A enters the gas turbine engine 10 via a forward mounted fan 14, where the air A is directed into two discrete streams: a core air 16 and a bypass air 18. The core air 16 is pressurized in series by a low-pressure compressor 20 and a high-pressure compressor 22, then mixed with fuel, and burned in a combustor 24. The core air 16 exits the combustor 24 as exhaust combustion gases 26, which expand in series through a high-pressure turbine 28 and then a low-pressure turbine 30 before being exhausted from the engine 10. The exhaust combustion gases 26 in combination with the bypass air 18 generate forward propulsive thrust. The low-pressure turbine 28 drives the low-pressure compressor 20 via a low rotor spool 34 revolving about a central, longitudinal axis 36 of the engine 10 while the high-pressure turbine 30 drives the high-pressure compressor 22 via a high rotor spool 38. Although two compressors 20, 22 and two turbines 28, 30 are illustrated in the disclosed non-limiting embodiment, other engine configurations may be provided.

In one non-limiting embodiment, the high rotor spool 38 remotely drives an externally mounted accessory gearbox system 40. A tower shaft 42 engages the high rotor spool 38 proximate the axis 36 through a first bevel gear set 44A and transfers the power radially outward through a second bevel gear set 44B within an angle gearbox 46. The power is then transferred via a lay shaft 48 to an accessory gearbox 50 which contains a gear train 51 to power at least one accessory system S.

The accessory gearbox 50 may be mounted to an engine frame section F—here illustrated as a fan frame section—for a minimal contribution to engine weight and reduced complexity. It should be understood that various accessory gearbox systems, mount locations and mount configurations may alternatively be provided.

Figure 2A:
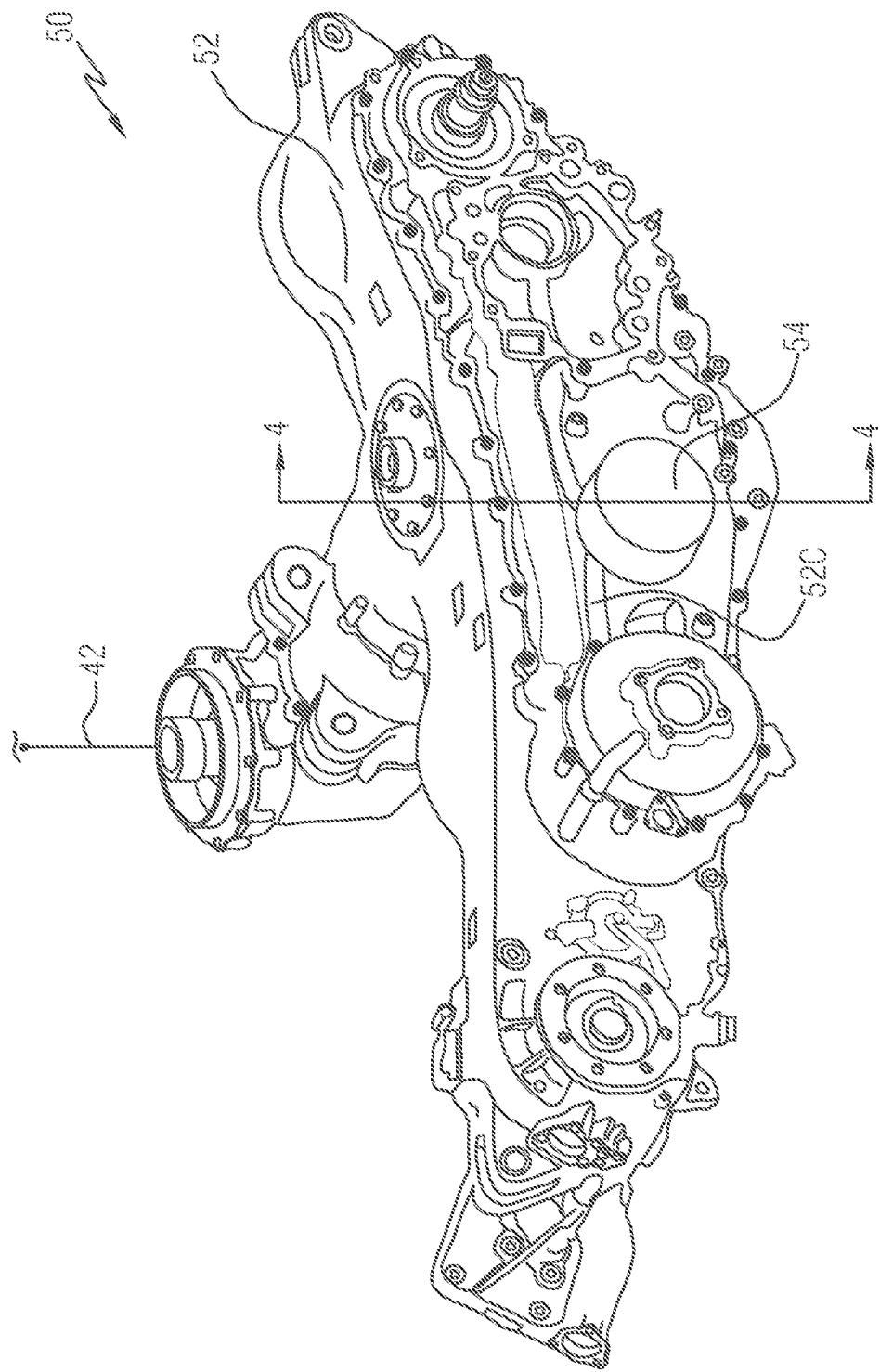
FIG. 2A is a perspective view of an accessory gearbox system.
Figure 2B:
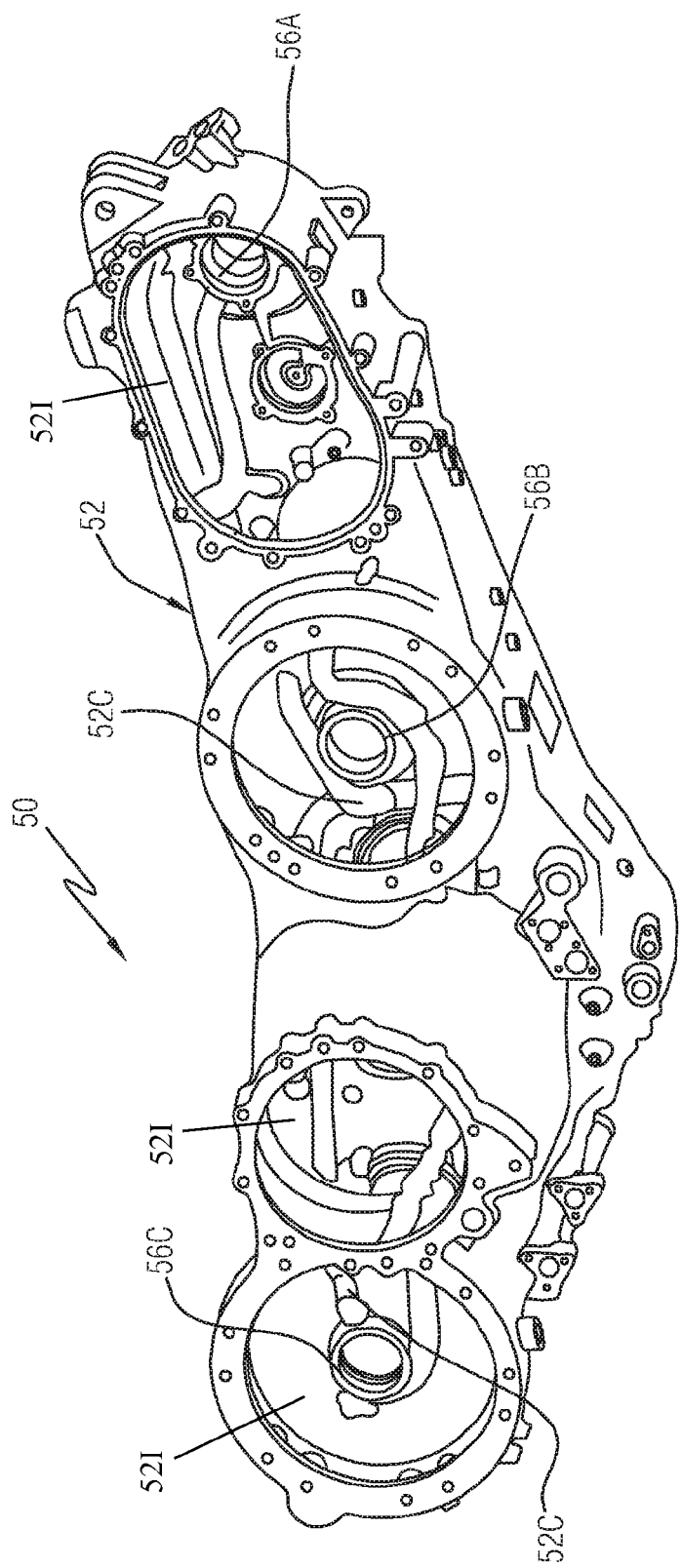
FIG. 2B is a perspective view of an accessory gearbox housing.

Referring to FIG. 2A, the accessory gearbox 50 includes an accessory gearbox housing 52 having a multiple of seal air cores 52C in communication with an accessory compressor 54. The multiple of seal air cores 52C (also illustrated in FIGS. 2B, 2C) are incorporated into the accessory gearbox housing 52.

Figure 3:
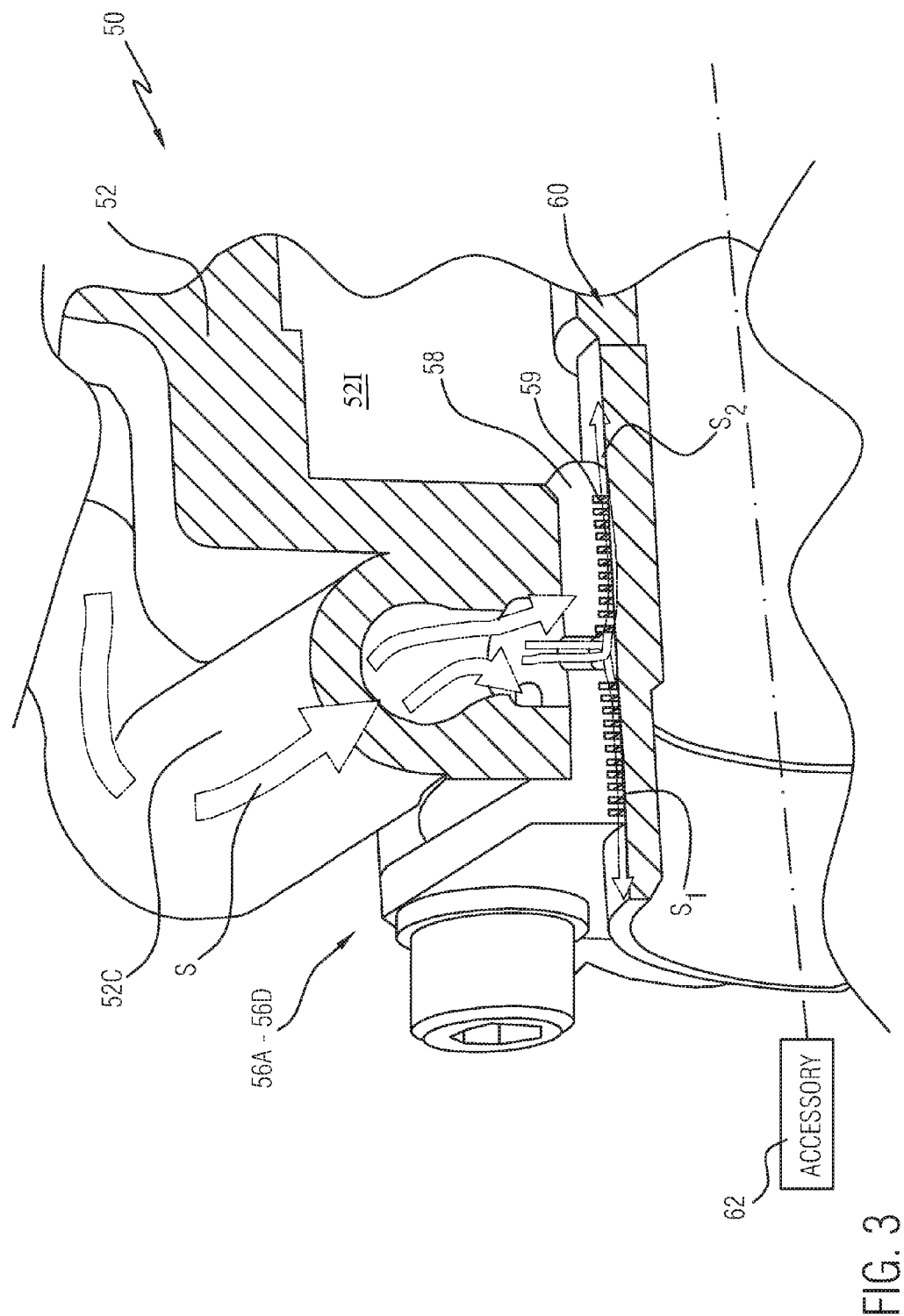
FIG. 3 is a schematic partial sectional view of an accessory shaft seal in communication with at least one of the multiple of seal air cores.

Referring to FIG. 3, seal air is used in the accessory gearbox housing 52 to prevent oil from escaping about the accessory shaft seals 56A-56D. Seal air S from the accessory compressor 54 travels through the multiple of seal air cores 52C and terminates at an outer section 58 of each of the labyrinth seals 56A-56D (FIG. 3). That is, seal air S generated by the accessory compressor 54 is communicated to each accessory shaft seal 56A-56D through a seal air core 52C.

At each accessory shaft seal 56A-56D seal air S terminates at an outer section 58 and flows axially along each accessory shaft 60 rotationally retained therein. Seal air S1 flows toward an accessory 62 (illustrated schematically) driven by the accessory shaft 60 to prevent debris from entering into the accessory gearbox housing 52. Seal air S2 flows toward the interior 52I of the accessory gearbox housing 52 to retain oil within the accessory gearbox housing 52.

Figure 4:
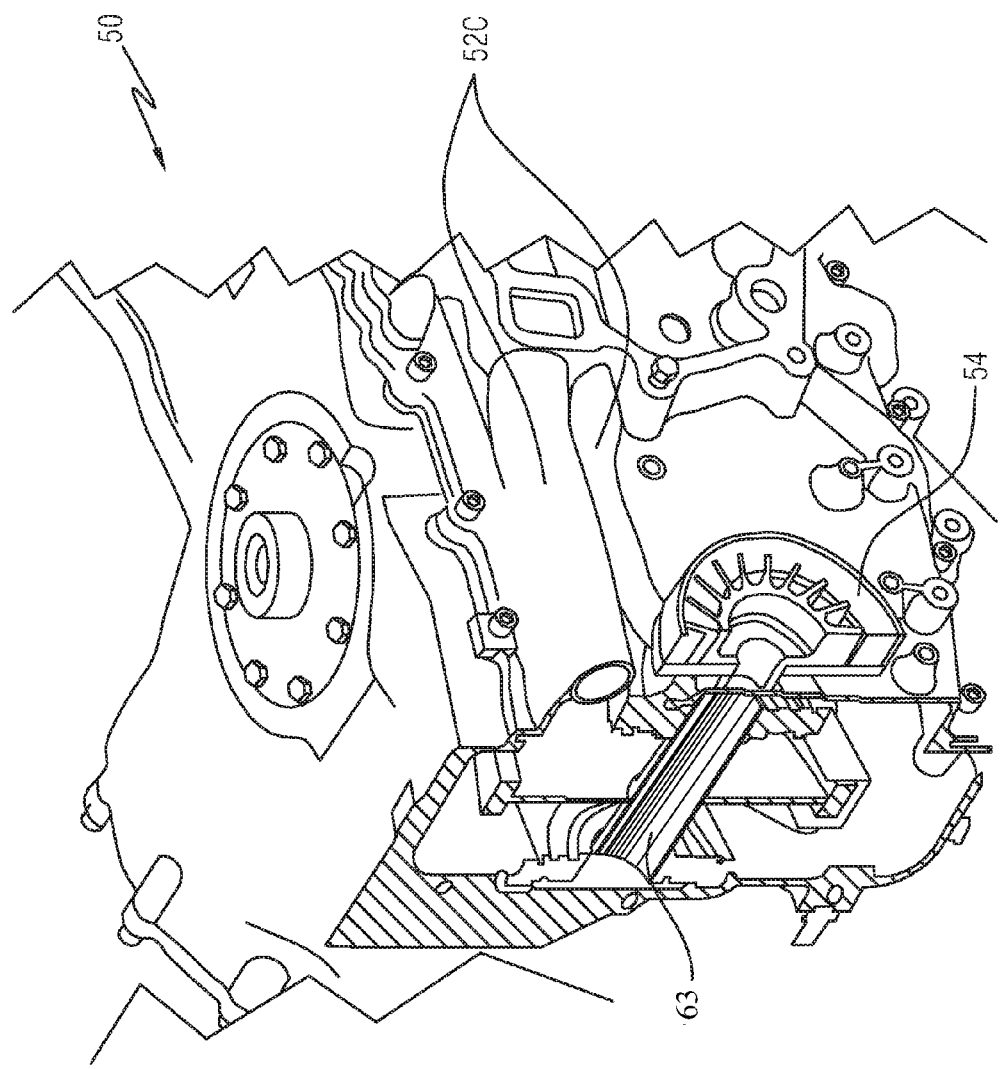
FIG. 4 is a sectional view of the accessory gearbox system taken along line 4-4 in FIG. 2A.

Referring to FIG. 4, the accessory compressor 54 may be driven directly by the accessory gearbox 50 through a drive shaft 63. Alternatively, other drive systems such as an electric motor may power the accessory compressor 54. The accessory compressor 54 eliminates the requirement of either engine bleed air and the potential degradation therefrom to the accessory shaft seals 56A-56D.

The interior 52I of the accessory gearbox housing 52 typically operates at an elevated pressure relative to the local ambient. Gearbox internal pressure is typically approximately 10 PSI above local ambient at take-off. This pressure is sealed therein by the accessory shaft seals 56A-56D. The accessory compressor 54 may draw air from within the interior 52I of the accessory gearbox housing 52 such that the accessory compressor 54 need only slightly compress the air above the internal gearbox pressure to provide sufficient flow to properly seal the accessory gearbox housing 52. That is, the accessory gearbox housing 52 interior air is at an elevated pressure relative to the local ambient such that the accessory compressor 54 need only slightly compress the accessory gearbox housing 52 interior air to provide an effective seal. Approximately 2 PSI above gearbox interior pressure is typically adequate for a proper seal. Alternatively, the accessory compressor 54 may communicate with ambient. Since ambient is at a relatively lower pressure than that within the accessory gearbox housing 52, the accessory compressor 54 may need to be of a somewhat increased capacity.

Figure 5:
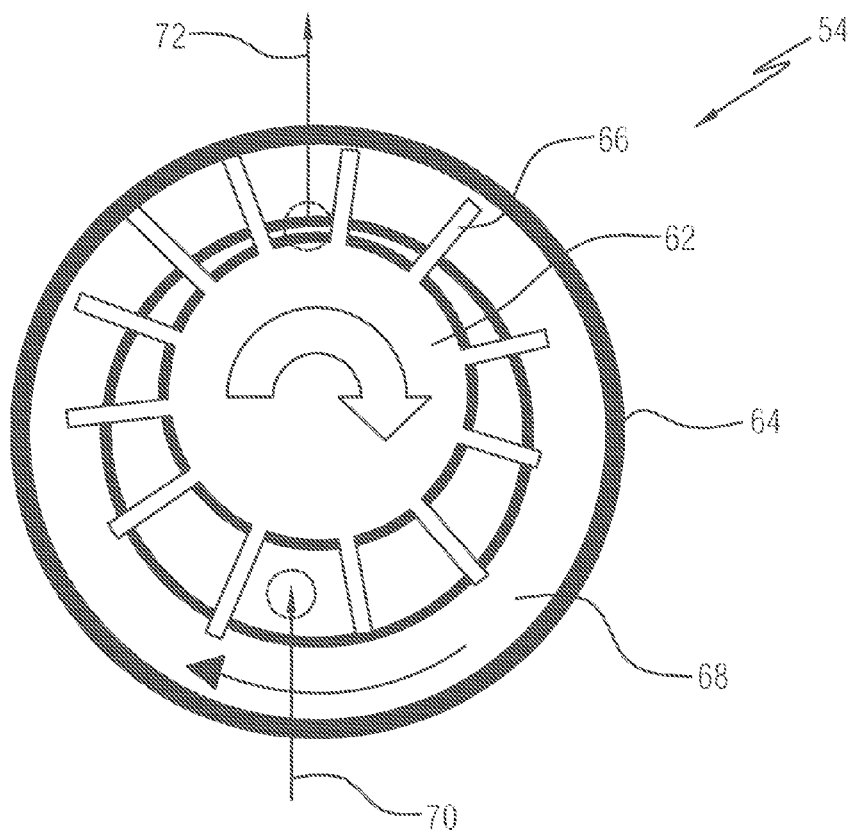
FIG. 5 is a simplified schematic view of a non-limiting embodiment of one accessory compressor type for use with the present invention.

Referring to FIG. 5, the accessory compressor 54 may be a liquid ring accessory compressor. An impeller 62 which is offset within a housing 64 rotates and traps pockets of air in the space between a multiple of impeller fins 66 and the housing 64. As the impeller 62 rotates a pocket of air is trapped in the space between each of the fins 66. The trapped air is compressed between the impeller 62 and the housing 64 which is sealed with an annulus of oil 68. As the air is compressed by the impeller 62 such that an inlet port 70 on one face of the accessory compressor 54 draws air for compression and subsequent discharge through an outlet port 72 on an opposite face fluid surface motion toward and away from impeller 62 center allows air to be drawn in and discharged without sliding contact.

Figure 6:
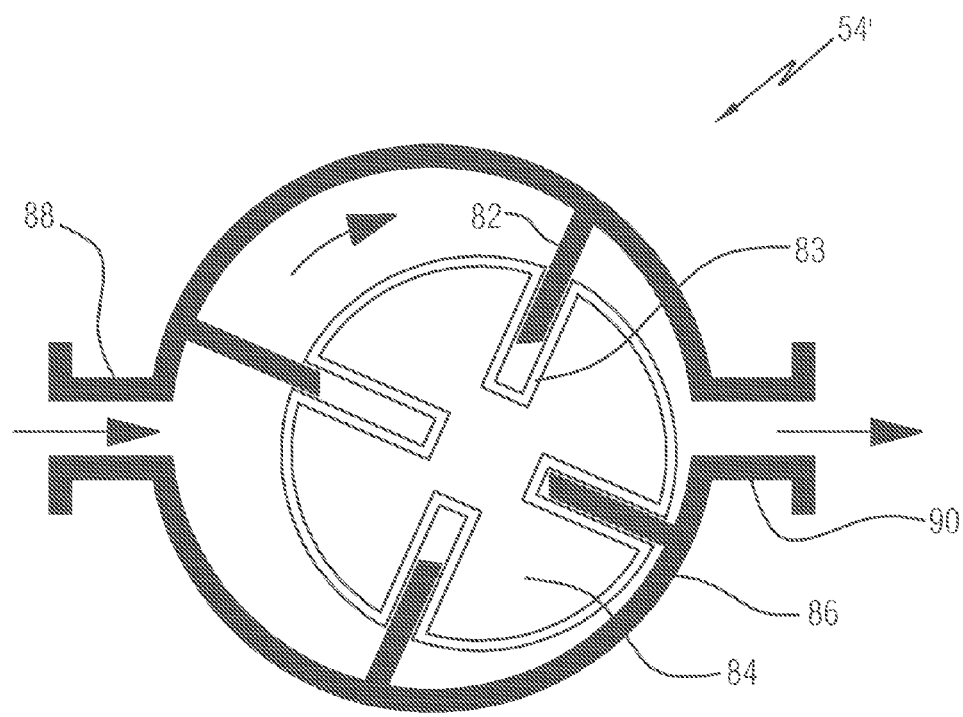
FIG. 6 is a simplified schematic view of a non-limiting embodiment of another accessory compressor type for use with the present invention.

Referring to FIG. 6, the accessory compressor 54' may alternatively be a sliding vane accessory compressor. Vanes 82 slide radially inward and outward within a respective slot 83 in a rotor 84. The rotor 84 is located off-center within a housing 86. As the rotor 84 rotates, the vanes 82 slide against the housing 86. As the rotor 84 is off-center, the vanes 82 move in and out of the rotor 86 such that a volume of air between the vanes 82 increases over one half of the rotation and decreases over the other half. An inlet port 88 is located at the point of largest volume and an output port 90 at a point of smallest volume. The inlet port 88 is located on one face of the accessory compressor 54' to draw air for compression and subsequent discharge through an outlet port 90 on an opposite face.

Although the liquid ring accessory compressor may minimize wear, the sliding vane accessory compressor may have greater thermal efficiency. Accessory compressor pressure rise is relatively low such that temperature increase (adiabatic compression plus efficiency loss) and heat transfer to the gearbox interior is also relatively low. Seal air flow is approximately 250 Deg F. (normal) (121° C.) and 300° F. (147° C.) on high-hot days is readily maintained. Such relatively low seal air temperatures extend gearbox housing material life.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. Although certain particular exemplary embodiments of this invention have been disclosed, one of ordinary skill in the art would recognize that certain modifications would be within the scope of this invention. It is, therefore, to be understood that within the scope of the appended claims, the invention may be practiced otherwise than as specifically described. For that reason the following claims should be studied to determine the true scope and content of this invention.

What is claimed is:

1. An accessory gearbox system for a gas turbine engine comprising:
    a gearbox housing which defines at least one seal air core and a gearbox housing interior; and
    an accessory compressor mounted to said gearbox housing to communicate a seal airflow through said at least one seal air core.

2. The system as recited in claim 1, wherein said at least one seal air core terminates at an accessory shaft seal.

3. The system as recited in claim 2, further comprising an accessory shaft mounted through said accessory shaft seal.

4. The system as recited in claim 3, wherein said an accessory shaft seal is a labyrinth seal, and said seal airflow flows axially along said accessory shaft.

5. The system as recited in claim 1, wherein said accessory gearbox housing contains a gear train which powers at least one accessory.

6. The system as recited in claim 5, wherein said accessory compressor is driven by said gear train.

7. The system as, recited in claim 1, wherein said accessory compressor is one of a liquid ring accessory compressor and a sliding vane accessory compressor.

8. The system as recited in claim 1, wherein said accessory compressor discharges entirely air.

9. The system as recited in claim 1, wherein said gearbox housing defines a multiple of seal air cores.

10. The system as recited in claim 9, further comprising a multiple of accessory shaft seals, said seal air cores terminate at a respective one of said accessory shaft seals, said accessory compressor communicating said seal airflow through said seal air cores to said accessory shaft seals.

11. The system as recited in claim 10, wherein each of said accessory shaft seals are mounted to said gearbox housing.

12. The system as recited in claim 10, wherein there are at least four accessory shaft seals, and wherein each of said accessory shaft seals is in communication with an accessory shaft from one of a power generator, a fuel pump, an oil pump and a hydraulic pump.

13. The system as recited in claim 10, wherein said seal air cores are integrally formed with said gearbox housing.

14. The system as recited in claim 13, wherein said seal air cores define a multiple of separate flow paths within said gearbox housing.

15. The system as recited in claim 10, wherein each of said accessory shaft seals are labyrinth seals.

16. The system as recited in claim 15, further comprising a multiple of accessory shafts, each accessory shaft mounted through a respective one of said accessory shaft seals.

17. The system as recited in claim 16, wherein said seal airflow flows axially along each of said accessory shafts.

18. A gas turbine engine comprising:
an engine frame section defined about an axis;
an engine spool rotationally mounted along said axis;
an accessory gearbox mounted to said frame section, said accessory gearbox driven by said engine spool, said accessory gearbox comprising:
a gearbox housing which defines at least one seal air core and a gearbox housing interior; and
an accessory compressor mounted to said gearbox housing to communicate a seal airflow through said at least one seal air core.

19. The engine as recited in claim 18, wherein said at least one seal air core terminates at an accessory shaft seal.

20. The engine as recited in claim 19, further comprising an accessory shaft mounted through said accessory shaft seal.

21. The engine as recited in claim 20, further comprising an accessory component mounted to said gearbox housing.

22. The engine as recited in claim 21, wherein said accessory component is driven by said accessory shaft.

23. The engine as recited in claim 18, wherein said engine frame section comprises a fan case.

24. The engine as recited in claim 18, wherein said gearbox housing defines a multiple of seal air cores, and further including a multiple of accessory shaft seals, said seal air cores terminate at a respective one of said accessory shaft seals, said accessory compressor communicating said seal airflow through said seal air cores to said accessory shaft seals.

25. The engine as recited in claim 24, wherein each of said seal air cores are incorporated into said gearbox housing, and wherein each of said accessory shaft seals are mounted to said gearbox housing.

26. A method of providing a seal air supply to an accessory gearbox comprising:
compressing a seal air with an accessory compressor mounted to an accessory gearbox housing, said accessory gearbox housing defining at least one seal air core and a housing interior; and
communicating the seal air through said at least one seal air core to an accessory shaft seal mounted to the accessory gearbox housing.

27. A method as recited in claim 26, further comprising the step of compressing the seal air from air within the accessory gearbox housing.

28. A method as recited in claim 26, further comprising the step of compressing the seal air from ambient air.

29. A method as recited in claim 26, further comprising driving the accessory compressor with a gear train contained within the accessory gearbox housing.

30. A method as recited in claim 26, further comprising driving the accessory compressor with an electric motor.

31. A method as recited in claim 29, further comprising driving the gear train with a gas turbine engine.

* * * * *